US010830602B2

(12) United States Patent
Loebbert (10) Patent No.: US 10,830,602 B2
(45) Date of Patent: Nov. 10, 2020

(54) SYSTEMS AND METHODS FOR PROVIDING DIRECTION GUIDANCE DURING OFF-ROAD ROUTING (71) Applicant: Alpine Electronics, Inc., Tokyo (JP)

(72) Inventor: Johannes Loebbert, Leinfelden-Echterdingen (DE)

( * ) Notice: Subject to any disclaimer, the term of this patent is extended or adjusted under 35 U.S.C. 154(b) by 322 days.

(21) Appl. No.: 15/865,124

(22) Filed: Jan. 8, 2018

(65) Prior Publication Data
US 2019/0212164 A1 Jul. 11, 2019

(51) Int. Cl.
*G01C 21/00* (2006.01)
*G01C 21/36* (2006.01)
*G01S 19/13* (2010.01)
*G01S 19/42* (2010.01)

(52) U.S. Cl.
CPC ..... *G01C 21/3626* (2013.01); *G01C 21/3632* (2013.01); *G01S 19/13* (2013.01); *G01S 19/42* (2013.01)

(58) Field of Classification Search
None
See application file for complete search history.

(56) References Cited

U.S. PATENT DOCUMENTS

| 6,356,837 | B1 * | 3/2002 | Yokota | G01C 21/34 |
| | | | | 701/411 |
| 10,038,977 | B2 * | 7/2018 | Rentz | G06Q 10/047 |
| 2002/0072849 | A1 * | 6/2002 | Endo | G01C 21/3667 |
| | | | | 701/432 |
| 2005/0049780 | A1 | 3/2005 | Friedrichs et al. | |
| 2008/0189034 | A1 | 8/2008 | Sugiura | |
| 2010/0088023 | A1 * | 4/2010 | Werner | G01C 21/20 |
| | | | | 701/467 |
| 2013/0096819 | A1 * | 4/2013 | Tarnok | G01C 21/20 |
| | | | | 701/428 |
| 2014/0244110 | A1 | 8/2014 | Tharaldson et al. | |
| 2016/0003621 | A1 * | 1/2016 | Koenig | G06F 3/04845 |
| | | | | 701/31.4 |
| 2016/0341562 | A1 * | 11/2016 | Samsonov | G01C 21/3461 |
| 2017/0205246 | A1 * | 7/2017 | Koenig | G07C 5/008 |
| 2017/0276496 | A1 * | 9/2017 | Mannami | G01C 21/3415 |
| 2017/0292850 | A1 * | 10/2017 | Madapati | G01S 19/42 |
| 2017/0314955 | A1 * | 11/2017 | Lynn | G06F 16/29 |
| 2018/0201264 | A1 * | 7/2018 | Schoenly | B60W 30/165 |

(Continued)

*Primary Examiner* — Jonathan M Dager
(74) *Attorney, Agent, or Firm* — Knobbe, Martens, Olson & Bear, LLP (57) ABSTRACT

Systems and methods for providing direction guidance to a traveler navigating off-road are disclosed. In some embodiments, different modes of direction guidance are provided depending on a deviation distance from a pre-recorded, off-road track. A pre-recorded track can be generated from an ordered list of locations. A real-time deviation distance between the traveler and the track can be determined. Based at least in part on the real-time deviation distance, the system determines whether the traveler is on track. If the traveler has deviated, the system may provide direction guidance toward a location where the traveler deviated from the track. The system may determine that the traveler has deviated too far from the track and provide direction guidance toward a closest point on the track. The system can display direction guidance on a vehicle-mounted display and/or on a mobile device.

20 Claims, 6 Drawing Sheets

(56) References Cited

U.S. PATENT DOCUMENTS

2018/0340789 A1* 11/2018 Bader ................ G01C 21/3476
2019/0215660 A1* 7/2019 Slushtz ................ H04W 4/024
2020/0003569 A1* 1/2020 Polanowski ....... G01C 21/3461

* cited by examiner

SYSTEMS AND METHODS FOR PROVIDING DIRECTION GUIDANCE DURING OFF-ROAD ROUTING

TECHNICAL FIELD

This disclosure relates to off-road routing and to systems and methods for providing direction guidance to a traveler during off-road routing.

BACKGROUND

Off-road driving is the activity of driving or riding a vehicle on unsurfaced roads or tracks, made of materials such as sand, gravel, riverbeds, mud, snow, rocks, and other natural terrain. Types of off-roading vary in intensity from leisure drives undertaken by hobbyists and enthusiasts to competitive drives undertaken by professionals. Some vehicles are specifically built to support off-road driving and can navigate on terrain that is challenging or impassable for on-road vehicles. There are communities of off-road drivers who share the thrill of off-road driving, and some drivers share information on the tracks they have driven as pre-recorded tracks or pre-recorded track information.

A traveler following along a pre-recorded track can deviate from the track. In some instances, the traveler may have deviated from the track because of traveler inattention. In some other instances, due to the off-road nature of the track, changed track conditions may force the traveler to find alternate paths. A deviation from the pre-recorded track can be dangerous, especially in an off-road setting, because the navigated terrain can include driving hazards. Driving hazards can result in injury to the traveler or damage to the traveler's equipment.

SUMMARY

Systems and methods are disclosed related to providing direction guidance to a traveler navigating off-road. In some embodiments, different modes of direction guidance are provided depending on a deviation distance from a pre-recorded, off-road track. A pre-recorded track can be generated from an ordered list of locations. A real-time deviation distance between the traveler and the track can be determined. Based at least in part on the real-time deviation distance, the system determines whether the traveler is on track. If the traveler has deviated, the system can provide direction guidance toward a location where the traveler deviated from the track. The system can determine that the traveler has deviated too far from the track and provide direction guidance toward a point on the track closest to the traveler. Some embodiments can display direction guidance on a vehicle-mounted display and/or on a mobile device.

One general aspect includes a system for providing direction guidance to a vehicle traveler following a pre-recorded track. The system can include a video display interface configured to send display data to a video display, a location data interface configured to receive a traveler location from a satellite-linked position receiver, a route data interface configured to receive pre-recorded track information including an ordered list of locations along a pre-recorded track, and a hardware processor connected to a memory system. The memory system can include instructions executable by the hardware processor, where the instructions, when executed by the hardware processor, cause the system to determine a real-time deviation distance between the traveler location and a location along the pre-recorded track, select a mode of direction guidance depending at least in part on the real-time deviation distance, and display direction guidance on the video display in accordance with the selected mode of direction guidance. The system can be configured to switch between two or more modes of direction guidance when the real-time deviation distance exceeds a first threshold value. Other embodiments of this aspect include corresponding computer systems, apparatus, and computer programs recorded on one or more computer storage devices, each configured to perform the actions of the methods.

Implementations may include one or more of the following features. The video display can be mounted in a vehicle and/or a display of a mobile device. The direction guidance can be rendered on a geographical map.

The instructions, when executed by the hardware processor, can be configured to cause the system to determine that the real-time deviation distance is less than the first threshold value and, in response to determining that the real-time deviation distance is less than the first threshold value, select the first mode of direction guidance. The system can be configured to determine a direction along the pre-recorded track in the first mode of direction guidance and display direction guidance indicating the direction.

The instructions, when executed by the hardware processor, can be configured to cause the system to determine that the real-time deviation distance exceeds the first threshold value and, in response to determining that the real-time deviation distance exceeds the first threshold value, select the second mode of direction guidance. The system can be configured to determine a deviation location where the traveler deviates from the pre-recorded track and determine a direction from the traveler toward the deviation location in the second mode of direction guidance. The system can display direction guidance indicating the direction.

The instructions, when executed by the hardware processor, can be configured to cause the system to, while the traveler is navigating along the pre-recorded track from a traversed coordinate to a following coordinate in the ordered list of locations, determine that the real-time deviation distance exceeds the first threshold value and, in response to determining that the real-time deviation distance exceeds the first threshold value, select the second mode of direction guidance. The system can be configured to determine a direction from the traveler toward the traversed coordinate in the second mode of direction guidance and display direction guidance indicating the direction.

The instructions, when executed by the hardware processor, can be configured to cause the system to determine that the real-time deviation distance exceeds a second threshold value, where the second threshold value is greater than the first threshold value. In response to determining that the real-time deviation distance exceeds the second threshold value, the system can select a third mode of direction guidance, where the system is configured to determine a closest location along the pre-recorded track that is a shortest distance between the traveler and the pre-recorded track and determine a direction from the traveler toward the closest location. Direction guidance indicating the direction can be displayed.

The system can include a user interface configured to receive a traveler indication to reverse a starting location and an ending location of the pre-recorded track, where the system is configured to provide direction guidance along the pre-recorded track towards the ending location indicated by the traveler. The hardware processor can be configured to receive an entry point along the pre-recorded track from the traveler. The instructions can be configured to cause the hardware processor to display the real-time deviation distance on the video display. The instructions can be configured to cause the hardware processor to display a real-time straight line distance between the traveler location and a destination location. The instructions can be configured to cause the hardware processor to display a real-time track distance between the traveler location and a destination location. The pre-recorded track information can include altitude information corresponding to the ordered list of locations along the pre-recorded track. Implementations of the described techniques may include hardware, a method or process, or computer software on a non-transitory computer-readable medium.

One general aspect includes a system for providing direction guidance to a traveler following a pre-recorded track. The system can include a video display interface configured to send display data to a video display, a location data interface configured to receive a traveler location from a satellite-linked position receiver, a route data interface configured to receive pre-recorded track information including an ordered list of locations along a pre-recorded track, and a hardware processor connected to a memory system. The memory system can include instructions executable by the hardware processor, where the instructions, when executed by the hardware processor, cause the system to determine a real-time deviation distance between the traveler location and a location along the pre-recorded track and determine that the real-time deviation distance exceeds a threshold value. In response to determining that the real-time deviation distance exceeds the threshold value, a closest location along the pre-recorded track that is a shortest distance between the traveler location and the pre-recorded track can be determined. Direction guidance indicating a direction from the traveler toward the closest location can be displayed. Other embodiments of this aspect include corresponding computer systems, apparatus, and computer programs recorded on one or more computer storage devices, each configured to perform the actions of the methods.

Implementations may include one or more of the following features. The video display can be mounted in a vehicle or can be a display of a mobile device. Implementations of the described techniques may include hardware, a method or process, or computer software on a non-transitory computer-readable medium.

One general aspect includes a non-transitory computer readable-medium including program instructions for providing direction guidance to a traveler following a pre-recorded track. Execution of the program instructions by a hardware processor can direct the hardware processor to receive a traveler location from a satellite-linked position receiver; receive pre-recorded track information including an ordered list of locations along a pre-recorded track; determine a real-time deviation distance between the traveler location and a location along the pre-recorded track; select, from a plurality of modes of direction guidance including a first mode and a second mode, a mode of direction guidance depending at least in part on the real-time deviation distance; and display direction guidance on a video display in accordance with the selected mode of direction guidance. The hardware processor can be configured to switch between the two or more modes of direction guidance when the real-time deviation distance exceeds a threshold value. Other embodiments of this aspect include corresponding computer systems, apparatus, and computer programs recorded on one or more computer storage devices, each configured to perform the actions of the methods.

Implementations may include one or more of the following features. The non-transitory computer-readable medium can include program instructions that, when executed by a hardware processor, direct the hardware processor to determine that the real-time deviation distance exceeds the threshold value; in response to determining that the real-time deviation distance exceeds the threshold value, determine a closest location along the pre-recorded track that is a shortest distance between the traveler location and the pre-recorded track; determine a direction from the traveler toward the closest location; and display direction guidance indicating the direction. In the first mode of direction guidance, the direction guidance can indicate a direction along the pre-recorded track. In the second mode of direction guidance, the direction guidance can indicate a direction from the traveler toward a closest location along the pre-recorded track that is a shortest distance between the traveler location and the pre-recorded track.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

DETAILED DESCRIPTION OF EMBODIMENTS

This disclosure presents various embodiments of systems and methods related to providing direction guidance along an off-road, pre-recorded track. The disclosure presents various embodiments of systems and methods related to providing safe and reliable return back on to the track when a traveler deviates or diverges from the track.

Providing direction and guidance instructions for a deviated traveler to safely get back on the track can be challenging because there is no road or street information to provide the traveler a path back onto the track. Some embodiments provide direction guidance back to the track so that an off-road traveler can return to the track with increased safety, reliability, and/or swiftness.

Some embodiments provide improved direction guidance that is adapted to the deviation distance of a traveler from a pre-recorded track. With reliable direction guidance, the traveler can avoid further complicating his situation by getting into a dead end or putting himself in a deadlocked situation. At least some disclosed systems and methods can help the traveler avoid dead ends, deadlocked situations, off-road hazards, personal injury, and/or damage to equipment.

Example Off-Road Routing on a Pre-Recorded Track

Figure 1:
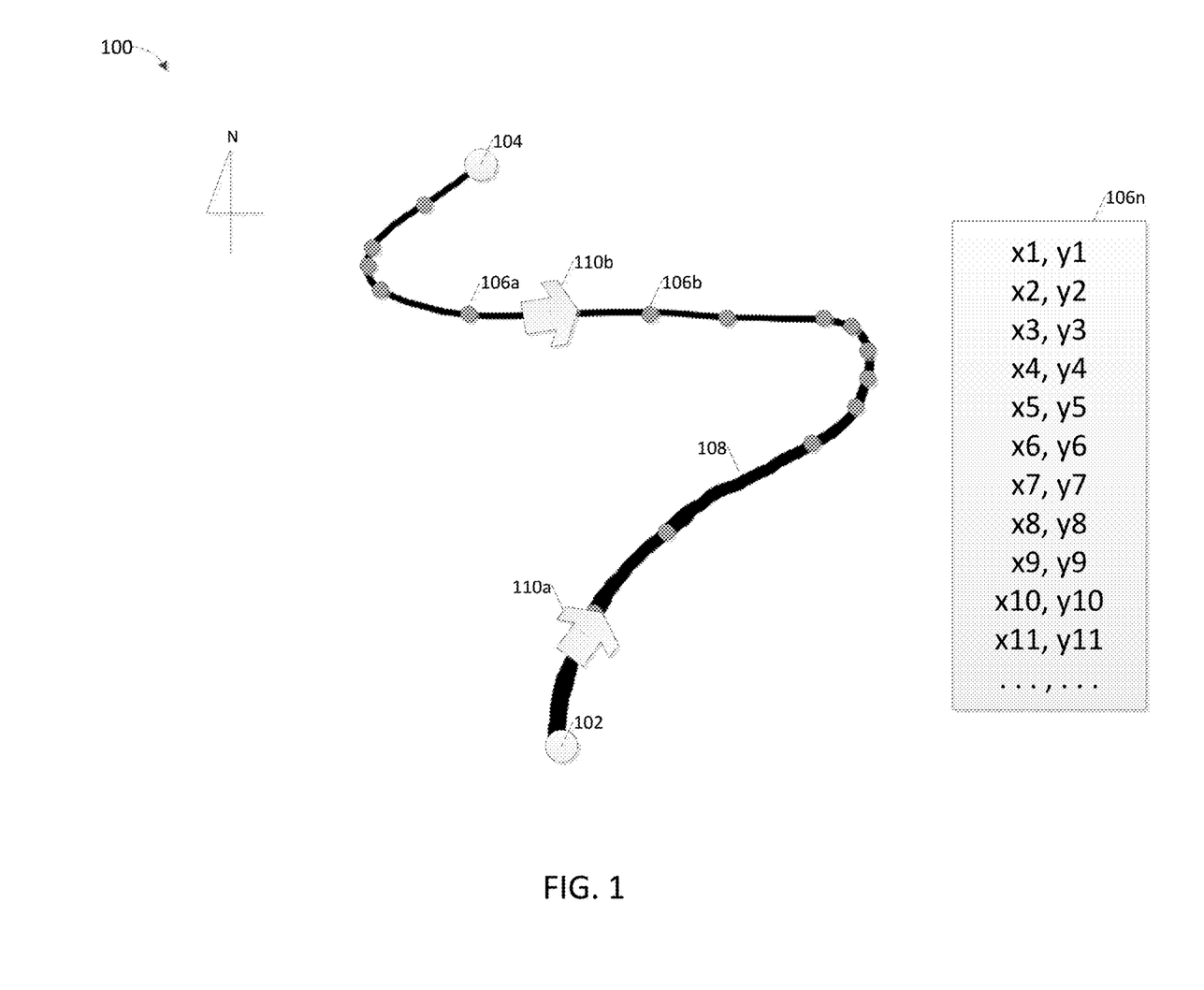
FIG. 1 illustrates an example pre-recorded track generated from an ordered list of known locations.

FIG. 1 illustrates an example pre-recorded track 100 generated from an ordered list 106*n* of known locations (such as, 106*a* and 106*b*), according to some embodiments. The ordered list of known locations can have associated coordinates (e.g., (x1, y1), (x2, y2), . . . ). The coordinates can have been generated from previous travels, or downloaded from an external source. The external source can be a server, such as an off-road enthusiast community server, which can make available ordered lists generated from trips completed by a member of the community. While the illustration shows an ordered list 106*n* of known coordinates as Cartesian coordinates, the coordinates can be in polar coordinates or according to some other coordinate system. Additionally, the illustration shows 2-dimensional coordinates, but the ordered list can include 3-dimensional coordinates. For example, locations with altitude information can be represented with 3-dimensional coordinates.

An off-road routing system can generate a pre-recorded track 108 from the ordered list. As FIG. 1 illustrates, the locations (such as 106*a* and 106*b*) represented by the coordinates in the ordered list can be used to generate a continuous track 108. The track 108 can be generated using interpolation or extrapolation algorithms, connected line segments, fitted curves, or any other suitable technique for joining an ordered list of coordinates. For example, a spline interpolation can be used on three adjacent coordinates to provide a continuous coordinates along the track 108. In some embodiments, the ordered list can contain higher density of coordinates in a given 2-dimensional area or 3-dimensional volume to provide better granularity of track information where a turn is abrupt or a climb is steep. In some embodiments, some metadata can be associated with the ordered list, such as an extended recording duration (which indicates difficult terrains) or high difficulty indication, and can be used adjust the density of coordinates.

The system can receive a starting location 102 and an ending location 104. The starting location 102 can be a traveler-selected entry point along the generated track 108. In some embodiments, the system provides an additional track for the traveler to get to the entry point. In some embodiments, the system can provide direction guidance, such as an arrow to the entry point, without a use of additional track.

For a given track 108, the system can allow a user to select a travel direction. For example, the user can select the ending location 104 as a starting location, reversing the travel direction. Upon reversal, the ordered list 106*n* can be reversed to accommodate the user's intention to travel along the track in the opposite direction of the recording traveler. FIG. 1 illustrates a user 110*a* navigating from the starting location 102 to ending location 104 and another user 110*b* navigating from the ending location 104 to the starting location 102. The system can provide direction guidance to travelers traversing the track in either direction.

Example Modes of Direction Guidance

Figure 2:
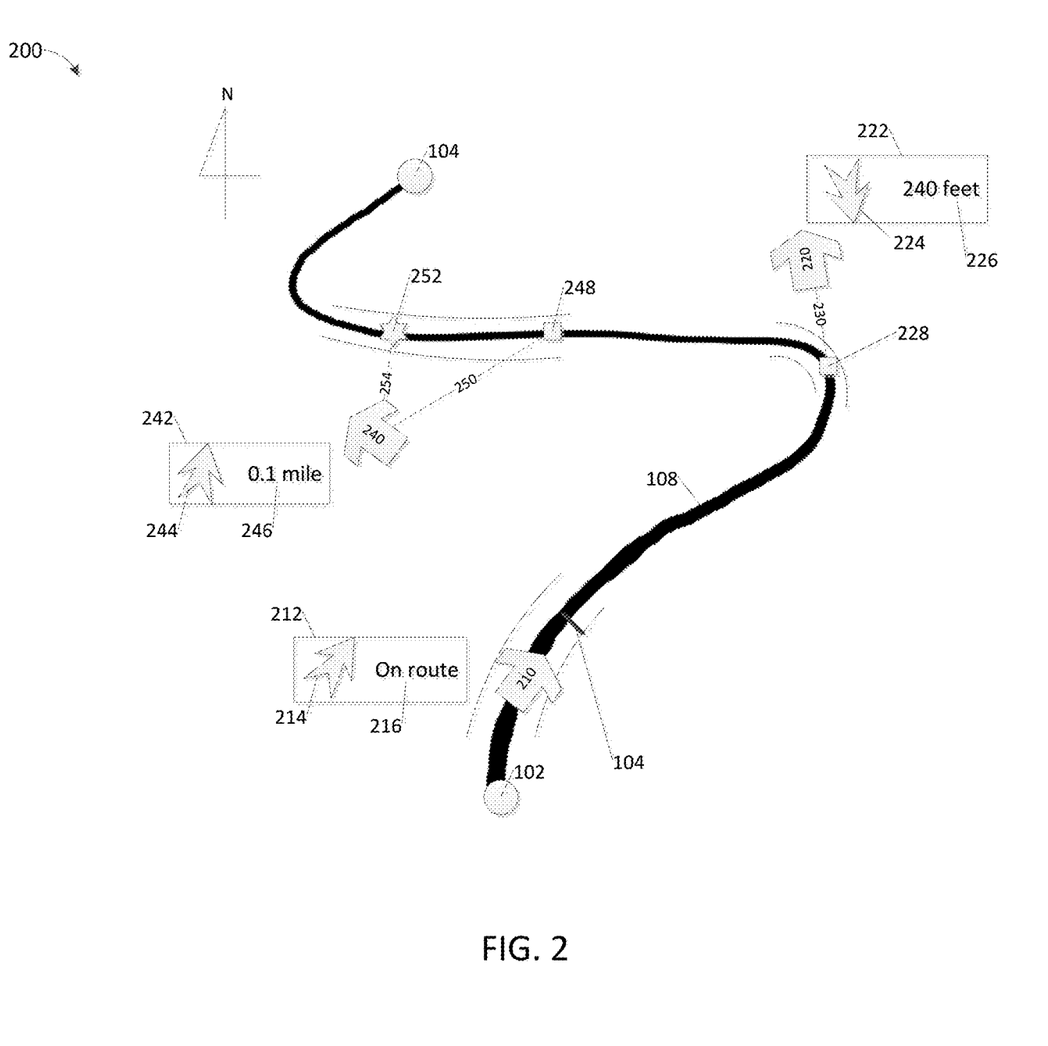
FIG. 2 illustrates an example of direction guidance along a pre-recorded track.

FIG. 2 illustrates an example of direction guidance along a pre-recorded track 108, according to some embodiments. A pre-recorded track 108 is generated from the ordered list of locations shown in FIG. 1. Three example locations of a traveler are illustrated to describe different modes of direction guidance. The mode of direction guidance provided can depend at least partially on a real-time deviation distance between the location of the traveler and the track 108. The track 108 can be represented by an expanded list of ordered coordinates, a collection of functions, joined line segments, a fitted curve, or any other suitable technique. In some embodiments, the real-time deviation distance can be calculated between the traveler coordinates and a coordinate on the track 108, such as, for example, a coordinate from the expanded list. In some embodiments, the real-time deviation distance can be calculated as a distance between a coordinate and a function.

Generally, the coordinate that is closest to the traveler's location may represent a real-time deviation distance. Any method of calculating distance between two coordinates on 2-dimensional or 3-dimensional surface can be used, including known methods. For example, a square root of the differences between the coordinates squared and summed may provide the real-time deviation distance (such as, for example, $\mathrm{sqrt}((x1\text{-}x\_loc)\wedge 2 + (y1\text{-}y\_loc)/\wedge 2))$. The following paragraphs describe different modes of direction guidance that can be provided to travelers with different deviation distances from a pre-recorded track.

First Mode: a Traveler Closely Navigates Along a Pre-Recorded Track.

A first traveler 210 is following closely along the pre-recorded track 108. The system may determine that the traveler 210 is navigating along the track based on whether the real-time deviation distance of the traveler from the track is within a first threshold value 104, which can be represented in terms of distance. This distance is visually illustrated in FIG. 2 as threshold rails about the track 108. Because the traveler 210 is staying within the threshold rails, the system can determine that the traveler is navigating closely along the track 108.

When the traveler is navigating closely along the track, the system can provide a first mode of direction guidance 212, in which the guidance indicates a directional symbol 214 along the route. In some embodiments, the direction guidance can also provide a textual indication 216, such as "on route." Because the traveler is safely navigating along the pre-recorded track, there is little to no concern of getting lost or damaging the traveler or the traveler's equipment.

Second Mode: a Traveler Deviates Slightly from the Track.

A second traveler 220 has deviated from the pre-recorded track. The system determines a real-time deviation distance for the traveler 220 and compares the real-time deviation distance against the first threshold value 104. Unlike the deviation distance of the first traveler 210, the real-time deviation distance for the second traveler 220 exceeds the first threshold value. FIG. 2 illustrates a traveler 220 who has deviated beyond the first threshold value, visually presented as deviating outside the threshold rails. The first threshold value can be a distance greater than or equal to 5 feet, greater than or equal to 10 feet, greater than or equal to 20 feet, greater than or equal to 30 feet, less than or equal to 50 feet, less than or equal to 100 feet, less than or equal to 200 feet, and/or between any of the preceding values. In some embodiments, the first threshold value varies depending on safety factors such as, for example, vehicle speed, nearby driving hazards, track complexity, and/or terrain complexity. In such embodiments, the first threshold value can be decreased when adverse safety factors are present.

In this situation, the routing system can provide a second mode of direction guidance 222, in which the guidance comprises a directional symbol 224 directing the traveler toward a deviation location 228. In some embodiments, the deviation location 228 is the last known location of the traveler along the track 108. In some embodiments, the deviation location is the last known location of the traveler within the threshold rails. In some embodiments, the deviation location is the location at which the deviation distance exceeded the first threshold value. Because the routing system can continuously or frequently monitor the traveler's location, the coordinates of the deviation location 228 can be retrieved and/or recorded at or shortly after the time that the deviation distance exceeds the first threshold value. In some embodiments, the deviation location may be calculated based on various factors, such as the direction in which the traveler is navigating the vehicle.

The direction guidance 222 can provide advantages to an off-road traveler 220 because it provides a direction indicator 224 which, when followed, can get the traveler back on the track 108 by re-traversing terrain that the traveler has already traversed. The direction 224 is generally navigable as the traveler 220 was on track up to the deviation location 228 and the traveler 220 has likely traveled to the current location from the deviation location 228. To some degree, the very fact that the traveler has navigated from the deviation location 228 indicates that the distance can be traveled back in reverse. In other words, it is likely that the traveler 220 has capacity to navigate the terrain in the direction indicated 224. In some embodiments, the direction guidance 222 provides an indicator 226 of the distance 230 to the deviation location 228, providing the traveler 220 with an idea of how far the traveler 220 has deviated and how far the traveler needs to travel to get back to the deviation location 228 and/or to the track 108. Accordingly, the direction indicator 224 and the distance indictor 226 to the deviation location 228 can assist the traveler 220 in safely getting back on the track 108. In some embodiments, the system provides directions toward the destination or a waypoint and/or direction guidance that shows the traveler 220 how to safely get back on track.

Third Mode: a Traveler Deviates Significantly from the Track.

In some scenarios, a traveler 240 may deviate from the track sufficiently far that navigating to a closest location on the track 252 is more desirable (for safety or time management) than returning to a deviation location 248. A traveler 240 who has traveled a substantial distance 250 from the deviation location 248 compared to a distance 254 to the closest location may be in such a scenario. The system can provide the traveler 240 with direction guidance 242 toward the closest location on the track.

In this mode, the direction guidance 242 may provide a direction indicator 244 toward the location on the track 252 closest to the traveler. Some embodiments also provide a distance indicator 246 for the remaining distance 254 toward the closest location 282 along the track 108. This mode is advantageous in that, when the traveler is sufficiently deviated from the track, it may be safer and quicker to follow a fast route back to the track than to re-traverse a longer path 250 back to the deviation location 248.

The method for determining the distance 254 to the closest location 252 along the track 108 can be similar to or different from the calculation method described above in relation to the calculation of the real-time deviation distance. For example, the real-time deviation distance may be calculated as a distance 250 from the deviation location to the traveler's real-time location, rather than the distance 254 to the closest track location 252. Therefore, the system keeping track of the real-time deviation distances and deviation locations may not need to execute extra instructions to determine or identify the real-time deviation distance 254 and the deviation location 248. The system may determine to use the third mode of direction guidance by comparing two distances 250 and 254. For example, the system may switch from the second mode to the third mode of direction guidance when the distance to the deviation location exceeds a second threshold value. In the FIG. 2 illustration, the system utilizes the first mode of direction guidance 212 when the real-time deviation distance is less than the first threshold. When the real-time deviation distance is greater than the first threshold but less than the second threshold, the system provides direction guidance 222 back to the deviation location (the second mode of direction guidance). When the real-time deviation distance is greater than the second threshold, the system provides direction guidance 242 toward a closest location on the track. The second threshold value can be greater than or equal to 50 feet, greater than or equal to 75 feet, greater than or equal to 100 feet, greater than or equal to 150 feet, greater than or equal to 250 feet, greater than or equal to 300 feet, greater than or equal to 400 feet, less than or equal to 500 feet, less than or equal to 1000 feet, and/or between any of the preceding values. In some embodiments, the second threshold value varies depending on safety factors such as, for example, vehicle speed, nearby driving hazards, track complexity, and/or terrain complexity. In such embodiments, the second threshold value can be increased or decreased when adverse safety factors are present.

As another example, the system can compare a distance 254 to the closest location of the track 252 against the distance 250 to the deviation location 248 and provide the third mode direction guidance when the difference between the two distances exceed a third threshold value. In such embodiments, when the difference between the distances exceeds the third threshold value, the routing system provides direction guidance 242 in accordance with the third mode. The third threshold value can have a value within a range specified for the first threshold value or the second threshold value. In some embodiments, the first, second, and third threshold values are preset values and/or user-configurable values.

As a further example, the system can be configured to switch to the third mode of direction guidance when the distance 250 to the deviation location 248 exceeds the distance 254 the closest location 252 the track by a multiplicative factor (such as, for example, 1.5×, 2.5×, or 3.3×). The multiplicative factor can be a preset value and/or a user-configurable value. A system using this type of criterion may be beneficial in that it allows for a degree of exploration around the deviation location 248 before switching to the third mode of direction guidance toward the closest location 252 on the track.

Various other criteria can be used to select between different direction guidance modes. Additionally, some of the criteria may be combined to provide new criteria. For example, the third threshold value and the multiplicative factor in the above examples may be used together to provide a criterion in which the distance 250 to the last deviation location 248 exceeds a multiplicative factor-adjusted (such as, for example, 2.5×) and threshold-tolerable (such as, for example, tolerate 50 feet deviations) distance to the closest location 252 (i.e., the distance to the deviation 250 must be at least 2.5× plus 50 feet of the distance 254 to the closest location 252). In some embodiments, a traveler can manually select between modes of direction guidance and/or select criteria for automatically switching between modes of direction guidance.

Criteria used in determining which direction guidance mode should be employed, such as threshold values and other factors, can be called "guidance parameters." For example, a threshold value of 25 feet can be adjusted to 20 feet, 30 feet, or like. The system can include default guidance parameters. Additionally, the system may allow a traveler to adjust the guidance parameters. In some embodiments, an ordered list of coordinates may have associated guidance parameters for the entire track or location-dependent guidance parameters for different portions of the track. For example, an ordered list representing a particularly challenging track may have associated guidance parameters with lower deviation tolerance, such that a smaller deviation distance may trigger switching between the direction guidance modes to better assist a traveler to stay on the track. In some embodiments, the system may allow for traveler override of the guidance parameters such that an adventurous traveler can use a more relaxed assistance or a cautious traveler can use a more strict assistance in getting back on the track. In some embodiments, the system may receive other relevant travel information, such as weather information, and may adjust the guidance parameters based on the information.

Example of Three-Dimensional Off-Road Routing

Figure 3:
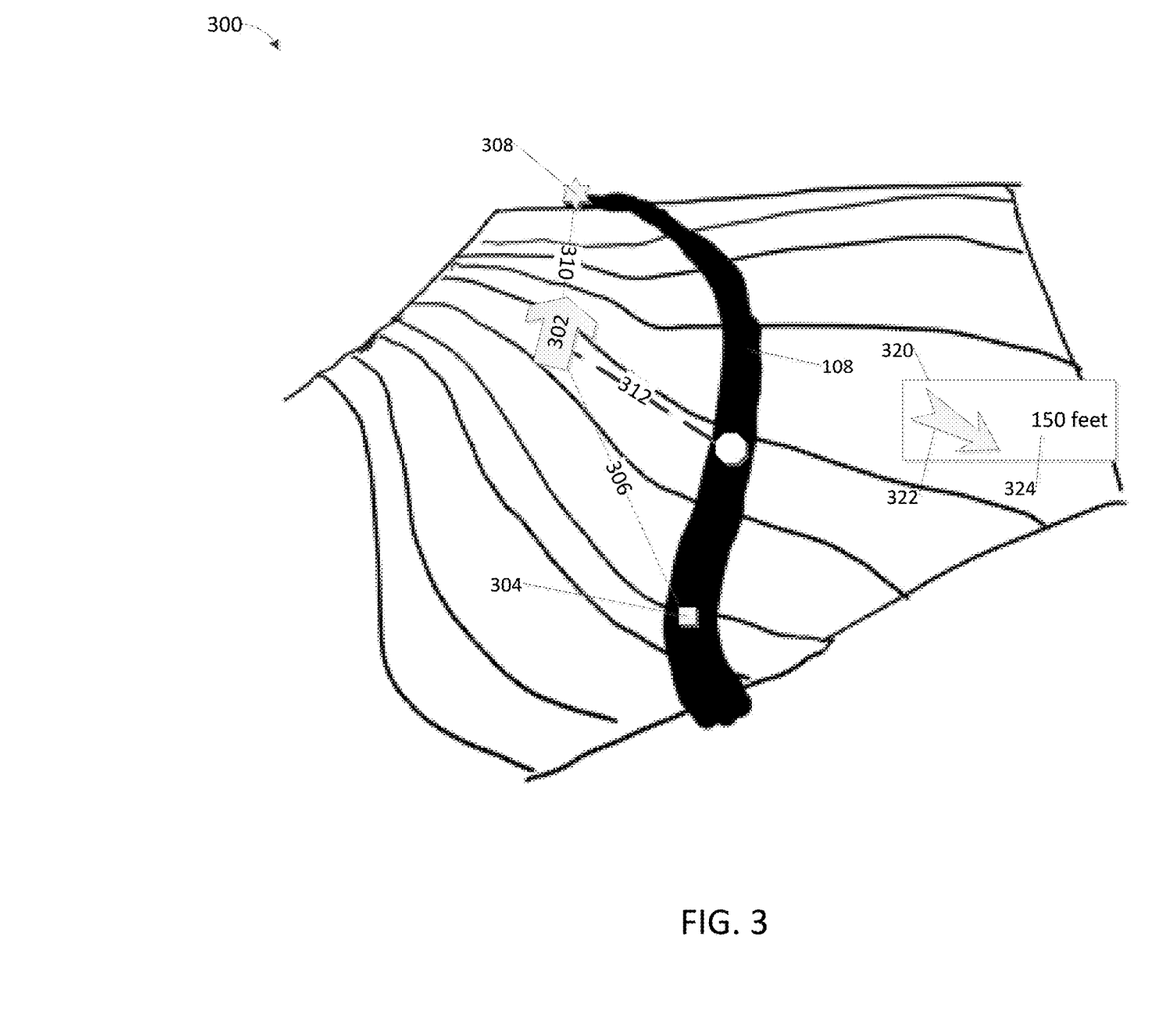
FIG. 3 illustrates an example of direction guidance along a pre-recorded track where the track information includes altitude information.

FIG. 3 illustrates example direction guidance along the pre-recorded track where the track includes altitude information, according to some embodiments. As disclosed above with respect to FIG. 1, the system may receive, in addition to 2-dimensional coordinates, altitude information associated with the coordinate. In some embodiments, the system may include or download a map data which includes such altitude information. In some embodiments, the system may use the altitude information to recommend a safer route back onto the track.

For example, FIG. 3 illustrates a set of contour lines often used in conveying altitude information. Narrowly positioned contour lines indicate a steep slope whereas broadly positioned contour lines indicate a gentle slope. A traveler 302 who has deviated from the track 108 may have a real-time deviation distance 306 and the distance 310 to the closest location on the track 308. Normally, when relying on 2-dimensional coordinates, the system may recommend the traveler 302 the second mode or the third mode of direction guidance. However, as FIG. 3 illustrates, a recommended direction in the second or third mode may not be desirable for safety or time because the slope in the recommended direction may be too steep to climb or descend (such as, for example, the slope toward the closest location 308 on the track). Also, in some instances, returning to the deviation location 304 may be considered too time consuming. In these instances, taking the altitude information into account and calculating slopes, the system may suggest a fourth mode of direction guidance back onto the track 108 following a path 312 having gentler slope changes. Similar to other direction guidance, the direction guidance 320 may provide a direction indicator 322 toward the track 108 and/or a remaining distance 150 to the track in the direction.

In some embodiments, the system may include a slope detector (such as an accelerometer) to provide slope information which the system may provide the direction guidance system to indicate that a recommended direction in one of the modes is not desirable. For example, with reference to FIG. 3, the system may originally recommend a direction toward the closest location 308 on the track, but after receiving slope information that the direction is too steep, may instead recommend an alternative path 312 toward a location on the track. Additionally, some embodiments may include a weather interface configured to receive weather information to further evaluate whether navigating toward a certain slope is feasible or safe.

Example User Interface

Figure 4:
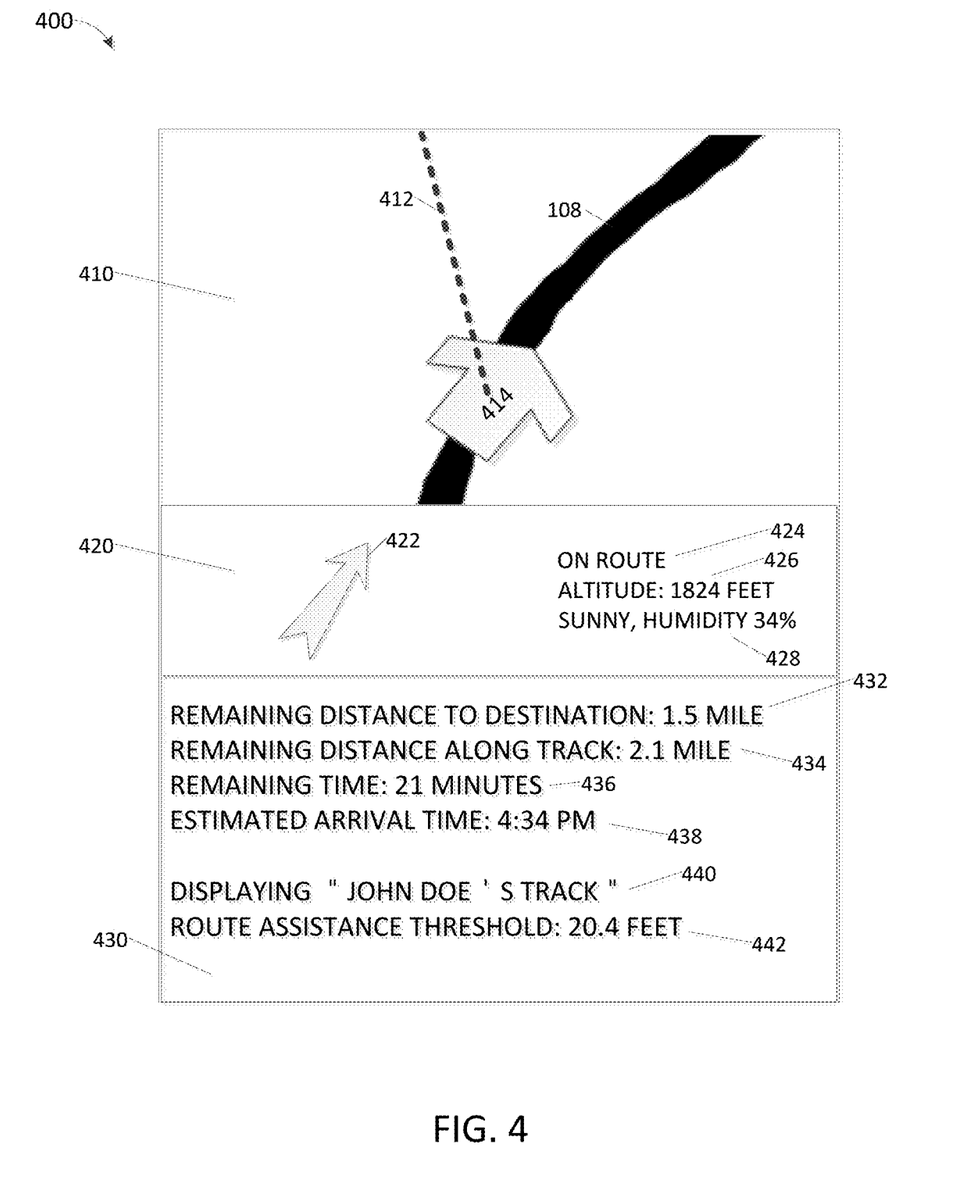
FIG. 4 is an example user interface showing various graphical elements with which a user can interact to change guidance parameters.

FIG. 4 is an example graphical user interface 400 showing various graphical elements with which a user may interact to change guidance parameters, according to some embodiments. The graphical user interface 400 is illustrated for the purpose of describing example graphical elements and related functions, and the specific form of presentation does not limit the scope of this disclosure. For example, one or more elements associated with a particular panel may be positioned in other panels or omitted entirely. The example graphical user interface 400 may present a map panel 410, a guidance panel 420, and an information panel 430. The map panel 410 may include a display of a pre-recorded track 108, an icon representing a traveler 414 (which may be a vehicle), and a destination indicator 412 that leads from the traveler toward a destination. While the FIG. 4 illustrates the traveler 414 on the track 108, the traveler 414 may have deviated from the track 108 as disclosed in relation to FIG. 2. The orientation of the traveler 414 can be indicated by an arrow or other indicator showing which direction the traveler 414 faces on the map.

The guidance panel 420 can include a direction guidance indicator 422, a current mode of direction guidance identifier 424, and/or real-time location-related information (such as, for example, altitude information 426 and/or local weather information 428). FIG. 4 illustrates a traveler 414 navigating along the track 108, so that the direction guidance indicator 422 indicates a direction along the track 108. However, in other modes of direction guidance, the direction guidance indicator 422 may indicate a different direction (e.g., a direction other than a direction along the pre-recorded track 108) according to a selected mode of direction guidance. Similarly, the direction guidance indicator 424 may provide different descriptions depending at least on the real-time deviation distance. In the graphical user interface 400, the system may provide a traveler a feature for selecting a current mode of direction guidance. For example, by tapping on the direction guidance indicator 422 and/or tapping on the current mode of direction guidance indicator 424, a traveler can, in some embodiments, manually override the system-selected mode of direction guidance and select a user-selected mode of direction guidance. In some embodiments, the system can automatically change the mode of direction guidance to a system-recommended mode once it is determined that the traveler is back on the track 108. The guidance panel 420 can also include other relevant information, such as an altitude 426 of the traveler's current location and/or local weather information 428. In some embodiments, a traveler may tap or otherwise interact with the graphical elements to modify measurement units, such as changing feet to meters or Celsius to Fahrenheit.

The information panel 430 may present navigation-related information, such as, for example, the remaining distance or straight line distance 432 to a destination, the remaining track distance 434 to the destination, the estimated time of arrival 438, the selected pre-recorded track 438, and one or more route assistance thresholds 442. As disclosed, the system can include and/or receive multiple pre-recorded tracks (e.g., ordered lists of locations) and allow a traveler to select a track that is stored in the system and/or available for loading onto the system. In some embodiments, pre-recorded track information may include track metadata, such as, for example, a rating of track navigation difficulty, photograph images, videos, weather information, or the like associated with particular pre-recorded tracks. The information panel 430 can present such track information and/or other information relevant to tracking. For example, the pre-recorded track information may include a photograph or video instructing the traveler how to navigate particularly difficult terrain or segments of the track. The system can provide such information to a traveler in order to better assist in navigating a track. In some embodiments, the system can select and provide such track information on its own based on the traveler's current location. In some embodiments, the system may allow a traveler to manually browse through and inspect such track information so that the traveler can be informed in selecting a particular track or get extra guidance.

Additionally, in some embodiments, the graphical user interface 400 may allow a traveler to adjust user preferences. User preferences can include one or more route assistance thresholds 442. A traveler can use the user interface to manually change the user preferences, adjust the thresholds 442 to make the switching between the direction guidance modes more or less responsive, select a mode that automatically sets the route assistance threshold, and/or select a default route assistance threshold.

Example System Diagram

Figure 5:
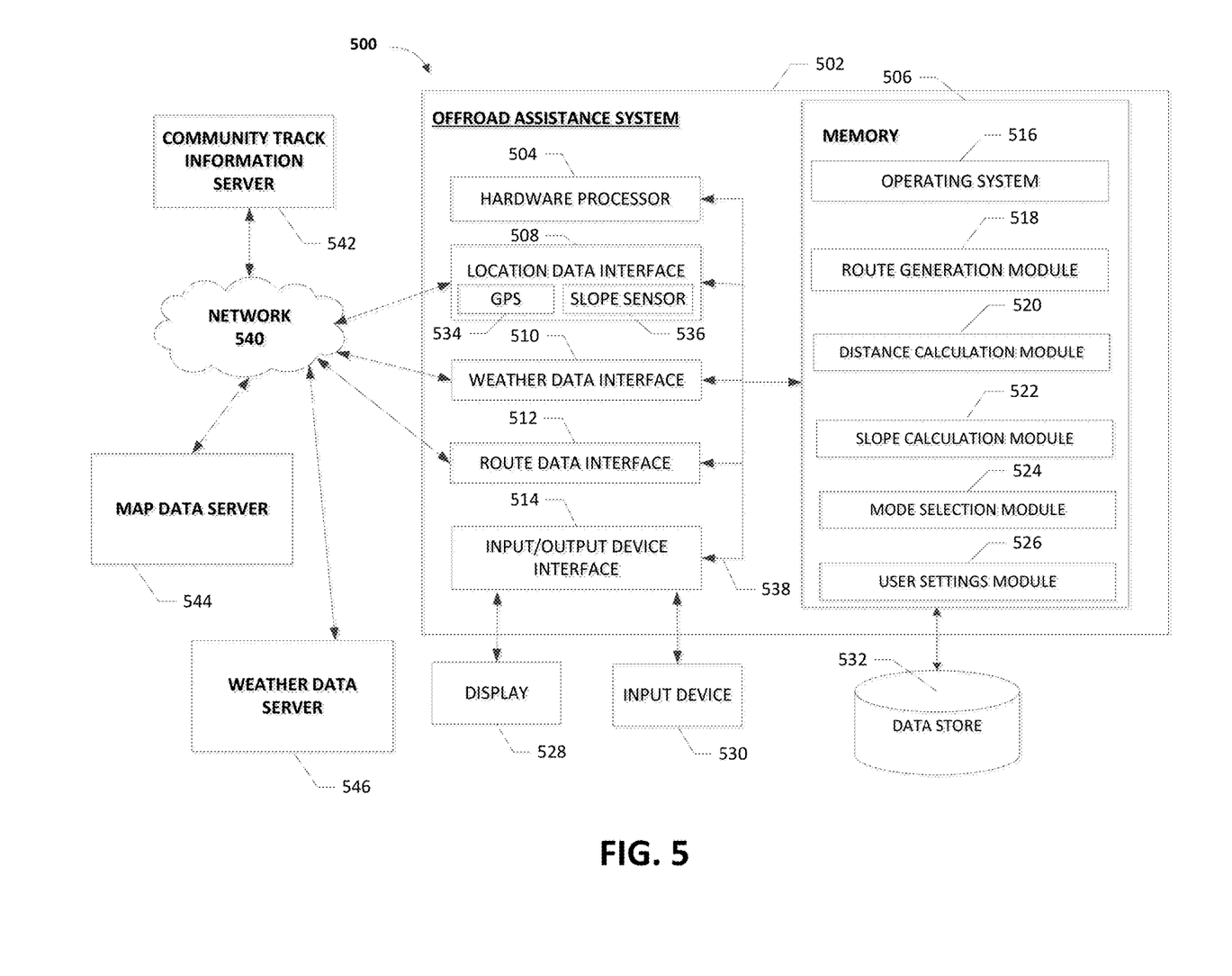
FIG. 5 is a system diagram of an example real-time direction guidance system.

FIG. 5 is an example system diagram of a real-time direction guidance system, according to some embodiments. As depicted in FIG. 5, the real-time direction guidance system 500 can include an off-road assistance computing system 502. The architecture of the off-road assistance computing system 502 can include an arrangement of computer hardware and software components used to implement aspects of the present disclosure. The off-road assistance computing system 502 may include more or fewer elements than those shown in FIG. 5. It is not necessary, however, that all of these elements be shown in order to provide an enabling disclosure. In some embodiments, the off-road assistance computing system 502 is an example of what is referred to hereinbefore as a real-time direction guidance system.

As illustrated, the off-road assistance computing system 502 can include a hardware processor 504, a memory 506, a location data interface 508, a weather data interface 510, a route data interface 512, and/or an input/output device interface 514, all of which can communicate with one another by way of a communication bus 538 or any other data communications technique. The hardware processor 504 can read and write to the memory 506 and can provide output information for the display 528 via the input/output device interface 514. The example graphical user interface 400 of FIG. 4 and/or other direction guidance information can be presented on the display 528. The input/output device interface 514 can also accept input from an input device 530, such as a keyboard, mouse, digital pen, microphone, touch screen, gesture recognition system, voice recognition system, and/or another input device capable of receiving user input. In some embodiments, the display 528 and the input device 530 can have the same form factor and share some resources, such as in a touch screen-enabled display.

In some embodiments, the location data interface 508, the weather data interface 510, and/or the route data interface 512 can be connected to a community track information server 542, map data server 544, and/or weather data server 546 via one or more networks 540 (such as the Internet, 3G/Wi-Fi/LTE/5G networks, satellite networks, etc.). The location data interface 508 can receive geopositioning information via the network 540 (the network 540 can provide one-way communication or two-way communication). In some embodiments, the location data interface 508 can include a geopositioning sensor 534 and/or a slope detecting sensor 536 (such as, for example, an accelerometer and/or a gyroscope). The location data interface 508 can receive geopositioning information from a satellite-linked navigation system and/or the network 540. In some embodiments, the location data interface 508 may receive, where applicable, alternate position information or information that can be used for location determination (such as a cellular and/or Wi-Fi signal that can be used to triangulate a location) and determine the off-road assistance system's location. In some embodiments, the location data interface 508 can receive slope information from a slope detecting sensor 536.

The weather data interface 510 can receive weather data from a weather data server 546 via the network 540. The weather data server 546 can provide an application programming interface (API) that the weather data interface 510 can access via the network 540 (such as, for example, a 3G, Wi-Fi, LTE, or similar cellular network). The route data interface 512 may receive track information (such as, for example, an ordered list of known location coordinates) from a community track information server 542 via the network 540. The track information can also include track-related information, such as photos and videos of interesting sites or difficult-to-navigate locations. In some embodiments, instead of receiving the track information over a network 540 from a community track information server 542, the system can receive such track information from a user via a computer-readable storage device, such as, for example, a USB thumb drive. The route data interface 512 can also receive map data from a map data server 544. In some embodiments, the map data can provide altitude information, which can be used by the slope calculation module 522 to calculate inclines and declines between locations.

The memory 506 can contain computer program instructions (grouped as modules or components in some embodiments) that the hardware processor 504 can execute in order to implement one or more embodiments described herein. The memory 506 can generally include RAM, ROM and/or other persistent, auxiliary or non-transitory computer-readable media. The memory 506 can store an operating system 516 that provides computer program instructions for use by the hardware processor 504 in the general administration and operation of the off-road assistance computing system 502.

The memory 506 can include computer program instructions and other information for implementing aspects of the present disclosure including a route generation module 518, distance calculation module 520, slope calculation module 522, mode selection module 524, a user settings module 526, other modules, and/or any combination of modules.

In some embodiment, the memory 506 may include the route interface module 518 that generates a track from the received ordered list of known locations using algorithms, such as interpolation or extrapolation algorithms. Additionally, the route generation module 518 may, in response to a determination to change direction guidance mode as determined by the mode selection module 524, may provide alternative routes for direction guidance.

In some embodiments, the memory 506 includes a distance calculation module 520 that the hardware processor 504 executes in order to determine a real-time distance between two or more coordinates, including the real-time deviation distance. Accordingly, the distance calculation module 520 can provide distance information to the mode selection module 524. Similarly, the slope calculation module 522 can, based on received map data, traveler location, and/or slope detection, provide slope information to the mode selection module 524.

In some embodiments, the memory 506 includes a mode selection module 524 that selects direction guidance mode according to various embodiments disclosed herein. The mode selection module 524 can determine a direction guidance mode based on the distance information from the distance calculation module 520 (such as the real-time deviation distance, distance to the closest location on the track, and/or distance from the deviation location), guidance parameters from the user settings module 526, and optionally from the slope calculation module 522. In some embodiments, the determination of a direction guidance mode can depend at least partially on the weather information received from the weather interface 510 and/or other information specific to a location or time.

In some embodiments, the memory 506 includes a user settings module 526. The user settings module 526 can provide access to various user settings related to user preferences, including guidance parameters. For example, the threshold values used for determination of the direction guidance mode may be accessed through the user settings module 526. In some instances, the user settings module 526 may provide connectivity to a data store 530 and access user settings from or store user settings to the data store 530. In some embodiments, other interfaces and modules, such as the location data interface 508, weather data interface 510, route data interface 510, route generation module 518, and/or user settings module 526 may generate an ordered list (and associated metadata) of a travel and store the travel information into the data store 532. In some instances, the off-road assistance computing system 502 may provide upload of such stored travel information onto the community track information server 542 via the network 540.

In some embodiments, the off-road assistance computing system 502 is installed in a vehicle and/or integrated with an on-board navigation system. In some embodiments, the system 502 can be a software application configured to execute on a general-purpose or special-purpose computing device, such as, for example, a smartphone, a tablet computer, a mobile GPS device, or a laptop computer.

Example Method of Off-Road Direction Guidance

Figure 6:
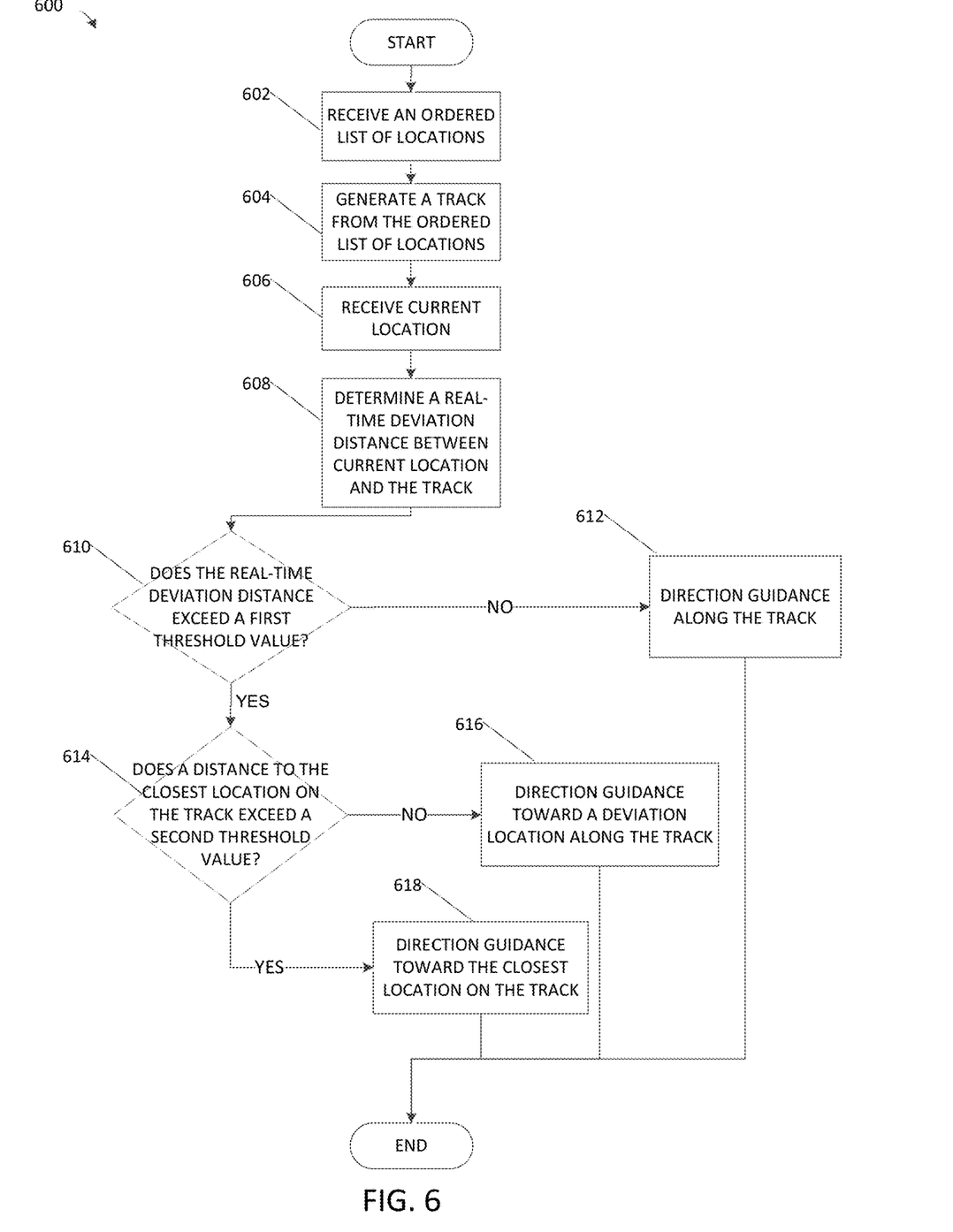
FIG. 6 is a flow diagram of an example method of providing off-road direction guidance.

FIG. 6 is a flow diagram depicting an example method of providing off-road direction guidance, according to some embodiments. The flow diagram is provided for the purpose of facilitating description of aspects of some embodiments. The diagram does not attempt to illustrate all aspects of the disclosure and should not be considered limiting.

At block 602, the system receives an ordered list of known locations. As described with reference to FIG. 1, the locations can be represented as 2-dimensional coordinates (x, y) or, when altitude information is also available, 3-dimensional coordinates (x, y, z). In some embodiments, the coordinates can be Cartesian coordinates, polar coordinates, or coordinates of different reference frames.

At block 604, the system can generate a pre-recorded track from the ordered list of locations. As described with reference to FIG. 1, the system can use one or a combination of various algorithms to generate the pre-recorded track. The various algorithms may be interpolation algorithms, extrapolation algorithms, or the like. In some embodiments, the pre-recorded track may be an expanded ordered list of coordinates. In some embodiments, the pre-recorded track may be a list of functions (such as, for example, a list of polynomial functions, piecewise-defined functions, fitted curves, and/or line segments mapped to the ordered list of coordinates).

At block 606, the system may receive a traveler's current location data. As described with reference to FIG. 5, the system can have a geo-spatial positioning receiver (e.g., a receiver compatible with GPS, GLONASS, BDS, Galileo, and/or other satellite navigation systems) and/or a location data interface to receive positioning information from a satellite link and provide real-time geolocation data. The traveler location data can be a 2-dimensional coordinate. In some embodiments, the system may have 3-dimensional map information available. The system may locate the 2-dimensional coordinate on the 3-dimensional map to determine an altitude associated with the traveler location. Accordingly, some embodiments include a location data interface that receives 3-dimensional location data or receives 2-dimensional location data and determines altitude based at least in part on the 2-dimensional location data.

At block 608, the system determines a real-time deviation distance between the traveler location and the track. This real-time deviation distance can be a vector distance having a value and a direction. Various geometrical properties, including known properties, may be used to obtain the real-time deviation distance. For example, the real-time deviation distance can be the shortest distance between the traveler location and the track. Therefore, the real-time deviation distance can be the length of a line segment with endpoints at the traveler location and along the track at a point where the line segment is perpendicular to the track. In a 2-dimensional Cartesian plane, two line segments can be said to be perpendicular when the product of the slopes of the line segments at the point of intersection is −1. Using this property, the system may pre-calculate slopes between adjacent coordinates of the expanded ordered list, and use the pre-calculated slopes to efficiently identify which of the adjacent coordinates provide perpendicular line segments in relation to the real-time deviation distance. The identified adjacent coordinates are candidates on the track that provide the shortest distance between the traveler location and the track. In some embodiments, the system can find a derivative of polynomials fitted between adjacent coordinates on the ordered list. In certain embodiments, the system quickly identifies a track coordinate that is a shortest distance away from the traveler location. Calculating the distance between the two identified coordinates can include finding a square root of the differences between the coordinates squared and summed in a Cartesian plane. Accordingly, the system can determine a real-time deviation distance between the location and the track. Various other known methods may be used to obtain the real-time deviation distance of the vehicle from the track.

At block 610, the system compares the real-time deviation distance against a first threshold value. The first threshold value, as described with reference to FIG. 2, may be used to determine whether a traveler is traveling along the track or has deviated from the track. In the FIG. 2 "first mode" discussion, the first threshold value was conceptually described as forming a "threshold rail." When the system determines that the real-time deviation distance is less than the first threshold value (i.e., the traveler is navigating within the rails), then the system may move to block 612. At block 612, the system provides direction guidance along the track. Otherwise, the system may move to block 614. In some embodiments, the system may provide an alarm to notify the traveler that the traveler has deviated from the track and/or that the system is guiding the traveler toward the deviation location on the track.

At block 614, the system compares a distance to the closest location on the track against a second threshold value. The second threshold value, as described with reference to FIG. 2, may be used to determine whether a traveler has deviated too far from the track. The system may already have the distance from the traveler location to the closest location on the track because the distance can be the real-time deviation distance calculated at block 608. When the system determines that the distance to the closest location on the track is less than the second threshold value (i.e., the traveler has deviated from the track, but not too far), then the system may move to block 616. At block 616, the system provides direction guidance back toward a deviation location along the track. A description of determining the deviation location along the track was provided with reference to the second mode of direction guidance shown in FIG. 2. When the system determines that the distance to the closest location on the track exceeds the second threshold value, the system may move to block 618. At block 618, the system may provide direction guidance toward the closest location on the track. In some embodiments, the system may provide an alarm to notify the traveler that the traveler has deviated too far from the track and/or that the system is guiding the traveler toward the closest point on the track.

The system can discontinue providing direction guidance when a stopping condition occurs, such as, for example, when the traveler reaches the end of the pre-recorded track and/or when a user instructs the system to cease providing direction guidance. Otherwise, the process can return to block 606 or block 608 so that continued direction guidance can be provided until a stopping condition has occurred.

As discussed, FIG. 6 illustrates an example embodiment of a method of providing direction guidance. Other embodiments can include one or more other criteria described with reference to FIG. 2 and/or other suitable criteria for accomplishing one or more objectives set forth in this disclosure. Such embodiments, which may omit or add to one or more the steps shown in the flow diagram of FIG. 6, are within the scope of this disclosure.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The following is claimed:

1. A system for providing direction guidance to a vehicle traveler following a pre-recorded track, the system comprising:
   a video display interface configured to send display data to a video display;
   a location data interface configured to receive a traveler location from a satellite-linked position receiver;
   a route data interface configured to receive pre-recorded track information comprising an ordered list of locations along a pre-recorded track;
   a hardware processor connected to a memory system, wherein the memory system comprises instructions executable by the hardware processor, wherein the instructions, when executed by the hardware processor, cause the system to:
      determine a real-time deviation distance between the traveler location and a location along the pre-recorded track;
      select, from two or more modes of direction guidance, including a first mode and a second mode, a mode of direction guidance depending at least in part on the real-time deviation distance; and
      display direction guidance on the video display in accordance with the selected mode of direction guidance;
   wherein the system is configured to switch between the two or more modes of direction guidance when the real-time deviation distance exceeds a first threshold value.

2. The system of claim 1, wherein the video display is mounted in a vehicle.

3. The system of claim 1, wherein the video display is a display of a mobile device.

4. The system of claim 1, wherein the direction guidance is rendered on a geographical map.

5. The system of claim 1, wherein the instructions, when executed by the hardware processor, are configured to cause the system to:
   determine that the real-time deviation distance is less than the first threshold value;
   in response to determining that the real-time deviation distance is less than the first threshold value, select the first mode of direction guidance, wherein the system is configured to determine a direction along the pre-recorded track in the first mode of direction guidance; and
   display direction guidance indicating the direction.

6. The system of claim 1, wherein the instructions, when executed by the hardware processor, are configured to cause the system to:
   determine that the real-time deviation distance exceeds the first threshold value;
   in response to determining that the real-time deviation distance exceeds the first threshold value, select the second mode of direction guidance, wherein the system is configured to determine a deviation location where the traveler deviates from the pre-recorded track and determine a direction from the traveler toward the deviation location in the second mode of direction guidance; and
   display direction guidance indicating the direction.

7. The system of claim 1, wherein the instructions, when executed by the hardware processor, are configured to cause the system to:
   while the traveler is navigating along the pre-recorded track from a traversed coordinate to a following coordinate in the ordered list of locations, determine that the real-time deviation distance exceeds the first threshold value;
   in response to determining that the real-time deviation distance exceeds the first threshold value, select the second mode of direction guidance, wherein the system is configured to determine a direction from the traveler toward the traversed coordinate in the second mode of direction guidance; and
   display direction guidance indicating the direction.

8. The system of claim 1, wherein the instructions, when executed by the hardware processor, are configured to cause the system to:
   determine that the real-time deviation distance exceeds a second threshold value, wherein the second threshold value is greater than the first threshold value;
   in response to determining that the real-time deviation distance exceeds the second threshold value, select a third mode of direction guidance, wherein the system is configured to determine a closest location along the pre-recorded track that is a shortest distance between the traveler and the pre-recorded track and determine a direction from the traveler toward the closest location in the third mode of direction guidance; and
   display direction guidance indicating the direction.

9. The system of claim 1 further comprising a user interface configured to receive a traveler indication to reverse starting and ending locations of the pre-recorded track, wherein the system is configured to provide direction guidance along the pre-recorded track towards the ending location indicated by the traveler.

10. The system of claim 1, wherein the hardware processor is configured to receive an entry point along the pre-recorded track from the traveler.

11. The system of claim 1, wherein the instructions are configured to cause the hardware processor to display the real-time deviation distance on the video display.

12. The system of claim 1, wherein the instructions are configured to cause the hardware processor to display a real-time straight line distance between the traveler location and a destination location.

13. The system of claim 1, wherein the instructions are configured to cause the hardware processor to display a real-time track distance between the traveler location and a destination location.

14. The system of claim 1, wherein the pre-recorded track information comprises altitude information corresponding to the ordered list of locations along the pre-recorded track.

15. A system for providing direction guidance to a traveler following a pre-recorded track, the system comprising:
- a video display interface configured to send display data to a video display;
- a location data interface configured to receive a traveler location from a satellite-linked position receiver;
- a route data interface configured to receive pre-recorded track information comprising an ordered list of locations along a pre-recorded track;
- a hardware processor connected to a memory system, wherein the memory system comprises instructions executable by the hardware processor, wherein the instructions, when executed by the hardware processor, cause the system to:
  - determine a real-time deviation distance between the traveler location and a location along the pre-recorded track;
  - determine that the real-time deviation distance exceeds a threshold value;
  - in response to determining that the real-time deviation distance exceeds the threshold value, determine a closest location along the pre-recorded track that is a shortest distance between the traveler location and the pre-recorded track, and determine a direction from the traveler toward the closest location; and
  - display direction guidance indicating the direction.

16. The system of claim 15, wherein the video display is mounted in a vehicle.

17. The system of claim 15, wherein the video display is a display of a mobile device.

18. A non-transitory computer readable-medium comprising program instructions for providing direction guidance to a traveler following a pre-recorded track, wherein execution of the program instructions by a hardware processor directs the hardware processor to:
- receive a traveler location from a satellite-linked position receiver;
- receive pre-recorded track information comprising an ordered list of locations along a pre-recorded track;
- determine a real-time deviation distance between the traveler location and a location along the pre-recorded track;
- select, from a plurality of modes of direction guidance comprising a first mode and a second mode, a mode of direction guidance depending at least in part on the real-time deviation distance; and
- display direction guidance on a video display in accordance with the selected mode of direction guidance;
- wherein the hardware processor is configured to switch between the two or more modes of direction guidance when the real-time deviation distance exceeds a threshold value.

19. The non-transitory computer-readable medium of claim 18, wherein execution of the program instructions by a hardware processor directs the hardware processor to:
- determine that the real-time deviation distance exceeds the threshold value;
- in response to determining that the real-time deviation distance exceeds the threshold value, determine a direction from the traveler toward a closest location along the pre-recorded track that is a shortest distance between the traveler location and the pre-recorded track; and
- display direction guidance indicating the direction.

20. The non-transitory computer-readable medium of claim 18, wherein, in the first mode of direction guidance, the direction guidance indicates a direction along the pre-recorded track and wherein, in the second mode of direction guidance, the direction guidance indicates a direction from the traveler toward a closest location along the pre-recorded track, wherein the closest location is a shortest distance between the traveler location and the pre-recorded track.

* * * * *